M. E. VAN LUVEN.
EGG CASE.
APPLICATION FILED JULY 3, 1908.
912,922.
Patented Feb. 16, 1909.
3 SHEETS—SHEET 1.
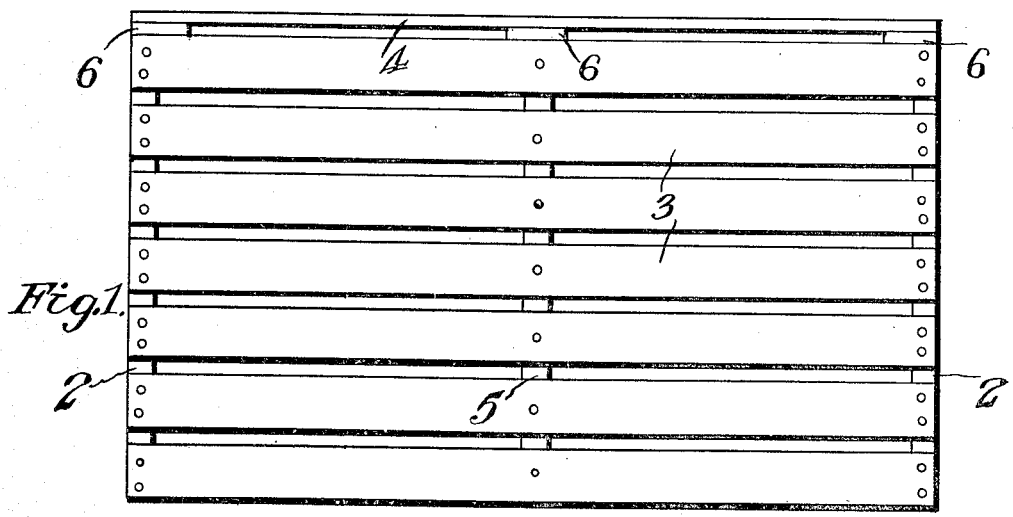
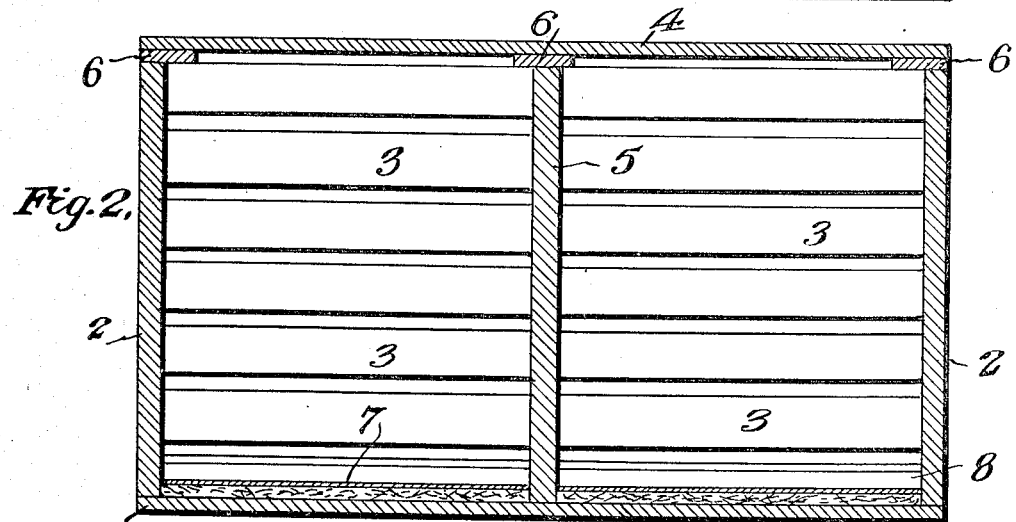
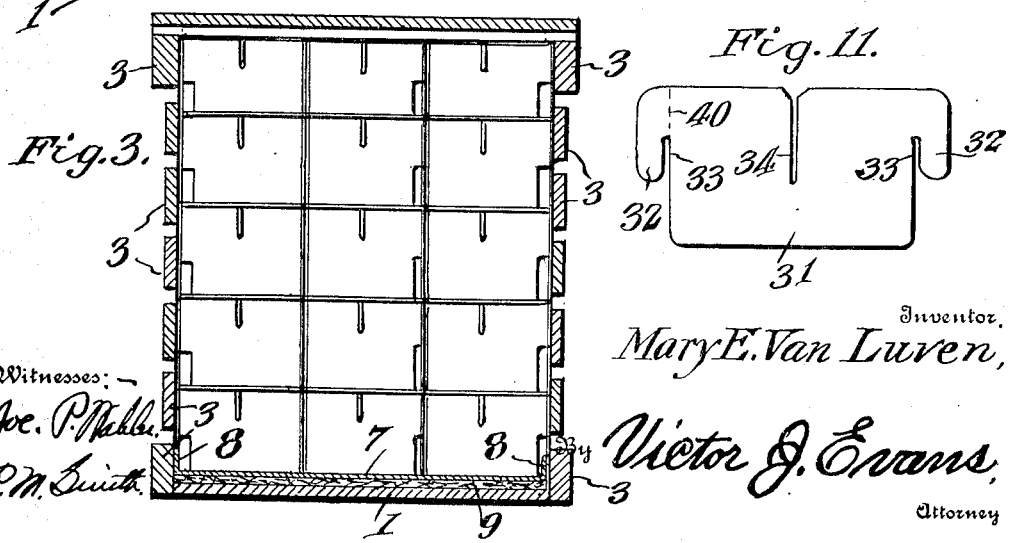
Inventor,
Mary E. Van Luven,
Witnesses:
By Victor J. Evans,
Attorney

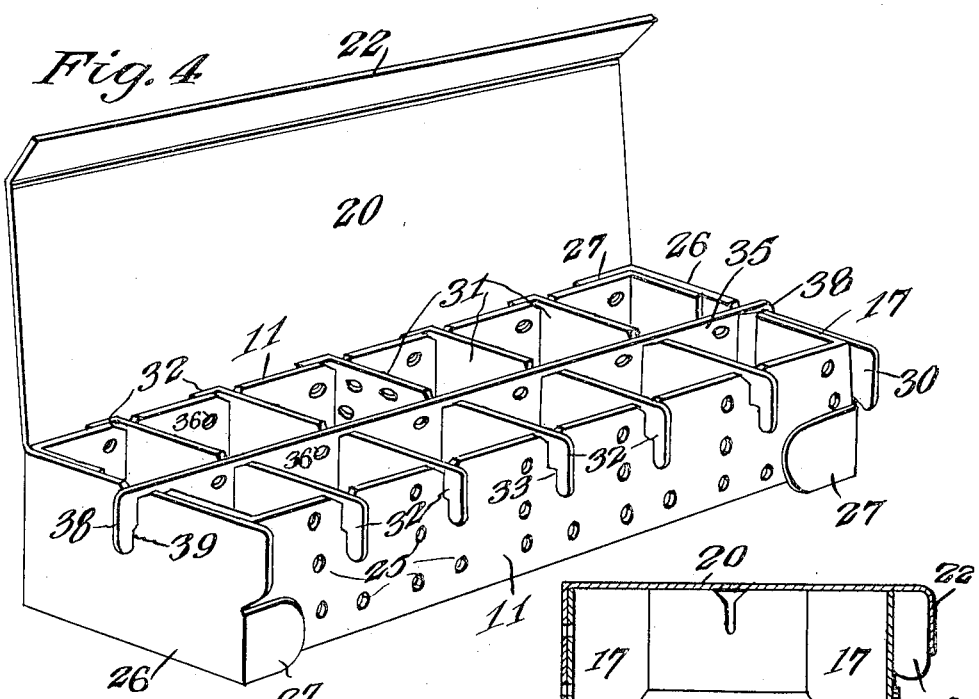
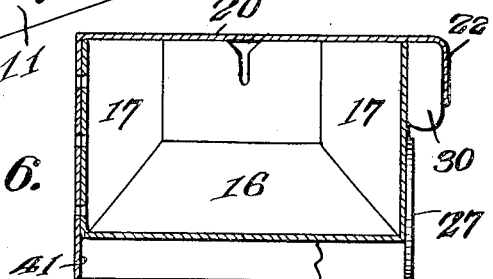
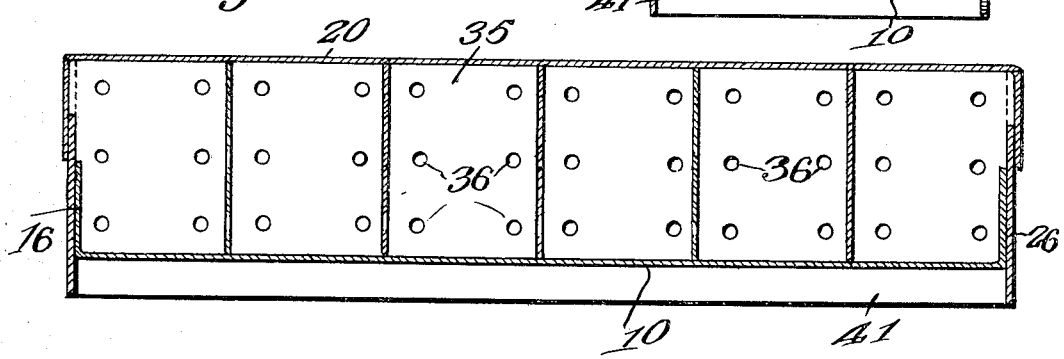
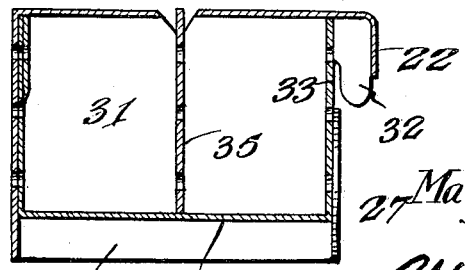

M. E. VAN LUVEN.
EGG CASE.
APPLICATION FILED JULY 3, 1908.
912,922.
Patented Feb. 16, 1909.
3 SHEETS—SHEET 3.
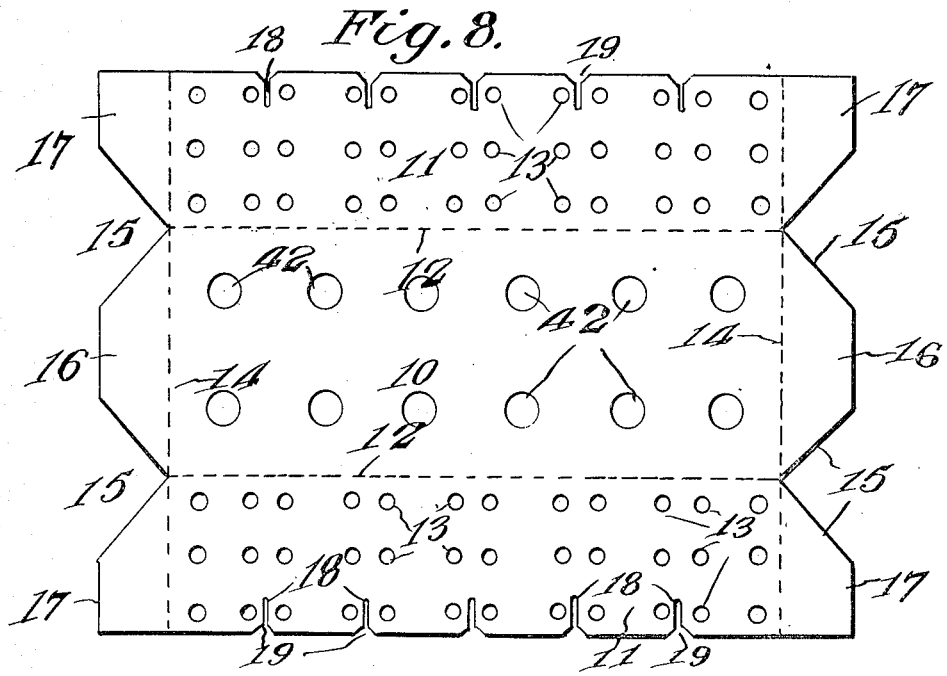
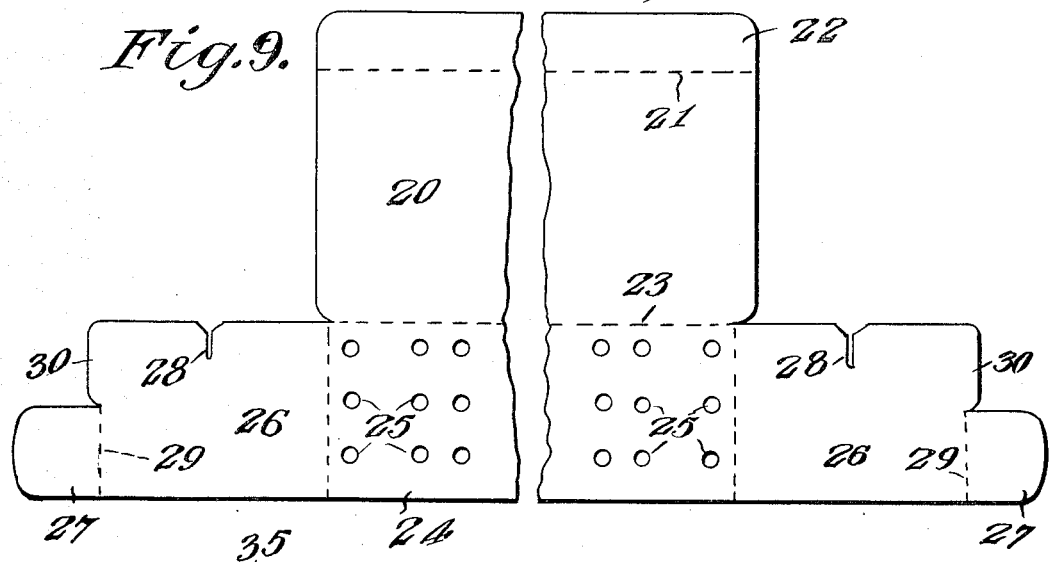
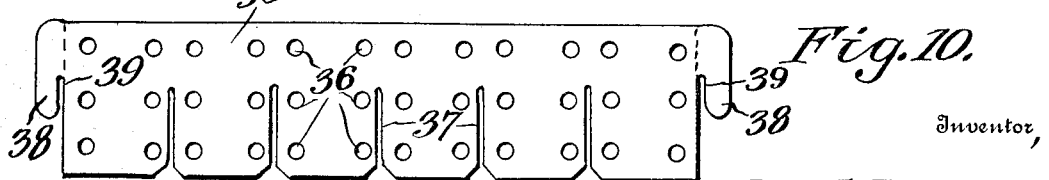
Witnesses:
Joe. P. Waller.
P. M. Smith.
Inventor,
Mary E. Van Luven.
By Victor J. Evans,
Attorney

UNITED STATES PATENT OFFICE.

MARY E. VAN LUVEN, OF OAKLAND, CALIFORNIA.

EGG-CASE.

No. 912,922.  Specification of Letters Patent.  Patented Feb. 16, 1909.

Application filed July 3, 1908. Serial No. 441,832.

*To all whom it may concern:*

Be it known that I, MARY E. VAN LUVEN, a citizen of the United States of America, residing at Oakland, in the county of Alameda and State of California, have invented new and useful Improvements in Egg-Cases, of which the following is a specification.

This invention relates to egg cases, the general object of the invention being to provide simple, cheap and practical means for packing, storing and transporting eggs.

The invention also has for its object to provide means for thoroughly ventilating the cells in which the eggs are placed, also to provide means for preventing the crushing of the cells and the consequent breaking of the eggs.

A further object of the invention is to provide means adapting a number of cartons to be packed in a common carrying or transporting crate while preventing the crushing of the cartons should unusual pressure be brought to bear on the crate.

With the above and other objects in view, the nature of which will more fully appear as the description proceeds, the invention consists in the novel construction, combination, and arrangement of parts, herein fully described, illustrated and claimed.

In the accompanying drawings:—Figure 1 is a side elevation of the crate in which the cartons are placed. Fig. 2 is a vertical longitudinal section through the same. Fig. 3 is a vertical cross section thereof. Fig. 4 is a perspective view of one of the cartons or egg cases showing the lid thereof raised. Fig. 5 is a vertical longitudinal section through the same. Fig. 6 is a vertical cross section thereof taken near one end and omitting the cross pieces and longitudinal strip. Fig. 7 is a central vertical cross section showing the longitudinal strip and one of the cross pieces. Fig. 8 is a plan view of the carton blank before folding the same in the form of a box or case. Fig. 9 is a similar view of the cover section of the carton. Fig. 10 is a plan view of the longitudinal strip. Fig. 11 is a plan view of one of the cross pieces.

The crate is preferably constructed throughout of wood being in the form of a rectangular box which comprises a bottom 1, ends 2 provided with suitable hand-holes for lifting and handling the crate, sides composed of a plurality of horizontal parallel slats 3 connected at their extremities to the ends 2, and a cover or top 4. It is also desirable to provide one or more intermediate partitions or center pieces 5 located at suitable distances apart or from the ends 2 to provide compartments proportionate in length and width to the external dimensions of the egg cases or cartons hereinafter described so as to keep said cartons or cases in separate stacks. The cover or top 4 is cleated on the under side as shown in Figs. 1, 2 and 3, the cleats 6 being arranged to rest upon the ends 2 and the center piece 5, as best illustrated in Fig. 2 which prevents any crushing strain on the cover or top 4 from being transmitted to the egg case or cartons contained in the crate, this being quite an important detail in the construction of the crate and in the means as a whole for preventing the breakage of the eggs in transportation.

In the bottom of each of the compartments of the crate there is arranged a false bottom 7 of card-board having the opposite edges thereof turned upward as shown at 8 to form guard flanges which will prevent said false bottom section from slipping outward between the slats 3 of the crate sides beneath which false bottom 7 and between said bottom and the bottom 1 of the crate, there is arranged a layer 9 of excelsior, said layer being of any desired thickness so as to form a cushion for the support of the several stacks of the cartons which will reduce to a still greater degree the liability of breakage of the eggs.

The carton of this invention comprises two main sections illustrated in Figs. 8 and 9 and other minor sections in the two forms illustrated in detail in Figs. 10 and 11. The section shown in Fig. 8 forms the main body section of the carton and is composed of a card-board blank which may, if desired, be coated with wax or similar material to prevent the accumulation or absorption of moisture around the eggs. The central portion 10 of the blank shown in Fig. 8 constitutes the bottom of the carton or egg case while the portions 11 at the opposite sides of the fold lines 12 constitute the long sides of the case, the same being provided with a large number of ventilation openings 13 to provide for a circulation of air at all times through the compartments or cells in which the eggs are contained. The blank is also provided with the transverse fold lines 14 which, taken in connection with the V- shaped incisions 15, form end flaps 16 and 17 which, when the blank is folded on all of the fold lines 12 and 14, constitute the partially open ends of the main body of the carton or egg case as best illustrated in Fig. 6. The outer edges of the sides 11 are provided with a series of slits 18, the outer portions of which are enlarged or flared as shown at 19 to receive and admit of the interlocking engagement therewith of the cross pieces hereinafter described.

The next section in importance or, in other words, the lid section of the carton or case is illustrated in plan in Fig. 9 before folding the same, said lid section comprising the lid portion 20 provided with a longitudinal fold line 21 to establish a closing flap 22 adapted to extend over and beyond one side of the main section of the box when folded as shown in Figs. 6 and 7. The lid section is also provided with a fold line 23 parallel with the fold line 21 which defines the lid proper from an additional box side 24 which is provided with ventilation openings 25 which correspond and register with the openings 13 in the adjacent side of the main section above described when the parts are folded and properly combined in their complete form. The blank shown in Fig. 9 is also extended to form the end flaps 26 which extend outside of the flaps 16 and 17 of the main section of the carton as shown in Fig. 4 and said end flaps are provided with projecting straps 27 which are lapped around the front corners of the cartons as shown in Fig. 4, the said straps being coated with adhesive material upon their inner faces and adhering to the adjacent front side of the case. The flaps 26 are provided in their top edges with slits 28 corresponding with the slits 18 above described and adapted to provide for the interlocked engagement therewith of the longitudinal strip of the carton hereinafter described. The straps 27 are folded on the line 29 shown in Fig. 9 and it will also be observed with reference to the same figure that projecting tabs 30 are provided just above the straps 27 which project beyond the corners of the box as shown in Fig. 4 to form seats for the final closing flap 22 of the lid section of the box as shown in Fig. 6.

In addition to the main body and lid sections above described, I employ a series of cross pieces 31, one of which is illustrated in plan in Fig. 11. Each cross piece 31 comprises projecting tabs 32 at opposite ends thereof between which and the body of the cross pieces there are slits 33 which, taken in connection with the slits 18 above referred to, provide for an interlocking engagement between the long sides of the carton and said cross pieces, thereby holding the cross pieces securely in place while admitting of ready separation between the parts referred to. Each cross piece 31 is also provided with a central slit 34 extending from the top edge thereof downward to provide for interlocked engagement with the longitudinal strip hereinafter described.

The longitudinal strip 35 illustrated in Fig. 10 is of a width equal to the depth of the carton or case and is provided with a large number of ventilation openings 36 and is also provided with a series of slits 37 extending from the bottom edge thereof upward a suitable distance. The longitudinal strip is further provided with end tabs 38 between which and the body of the strip there are slits 39 which are adapted to register with the slits 28 in the end flaps 26 of the lid section thereby forming an interlocked connection between the longitudinal strip and said end flaps, serving to hold the box sections together.

The end tabs 38 are adapted to be folded flatwise against the outer surfaces of the end flaps 26 or left projecting straight outward therefrom as shown in Fig. 4. The slits 37 register with the slits 34 of the cross pieces and thus there is formed an interlocked engagement between said longitudinal strip and all of the cross pieces of the case. The end tabs 32 at one end of the cross pieces may be folded on the line 40 so as to lie flatwise between the back of the lid section and the adjacent side 11 of the main section of the case as shown in Figs. 4 and 5. It will be observed that the distance between the fold lines 21 and 23 of the cover section is sufficient to enable the flap 22 to rest against the extreme outer edges of the end tabs 32 of the cross pieces and likewise against the edges of the tabs 30 of the end flaps 26. In the preferred embodiment of the invention the portions 24 and 26 of the lid section are made wider than the sides 11 of the main section so that while the upper edges of said parts are brought into alinement with each other as shown in Figs. 4, 5, 6 and 7, the lower edges of the parts 24 and 26 will project below the bottom 10 of the main section and thereby form a supporting chime 41 which will support the bottom 10 clear of the underlying case or bottom of the crate and give the necessary flexibility and yielding properties to the bottom of the carton or egg case. Furthermore if any excessive pressure is brought to bear on one or more of the cartons the flange or chime 41 will yield or bend or break before the eggs themselves are subjected to breaking pressure. It will also be noted that the lower edges of the straps 27 are in line with the corresponding bottom edges of the portions 24 and 26 of the lid section, thereby adding to the effect just described.

In view of the foregoing description it will be seen that thorough ventilation is had for each and every cell of the carton or case and that ample provision is made for permitting the yielding of each and every wall of each individual egg cell and thus it will be practically impossible to break any of the eggs when placed in the cartons and when the latter are properly packed in the transporting crate hereinabove described. The projecting tabs 30 and 32 allow for a free entry and exit of air beneath the lid and also between the adjacently lying cartons or cases while the slatted formation of the common carrying case or crate provides for the admission of an ample supply of air to each and all of the cartons or cases.

It will be observed by reference to Fig. 3 that the top and bottom slats 3 are of greater thickness than the intermediate slats, which insures ventilation between adjacent crates no matter how closely the same may be packed together. The cleats 6 serve two purposes in that they operate to strengthen the cover and also hold the cartons in position without pressing on the covers of the cartons. The excelsior mat in the bottom of the case absorbs jar and vibration to which the cartons may be subjected during transportation and handling.

By reference to Fig. 8, it will be seen that the bottom of the carton is provided with a series of relatively large openings or perforations 42 one of which occurs at the center of each individual egg cell thereby enabling the case to be tested or candled without removing them from the carton and without handling. If desired, a part or section of the carton as a whole may be coated or treated with wax to render the same impervious to moisture.

Having thus described the invention, what is claimed as new, is:—

1. An egg case, a carton embodying a main section comprising ventilated sides and ends, and a bottom, a lid section comprising a lid proper, a supplemental side having ventilation openings corresponding with the ventilation openings in the side of the main section, and end flaps extending outside of and along in contact with the ends of the main section, a longitudinal cell-forming strip having an interlocked engagement at its ends with the said flaps of the lid section, and a plurality of cross pieces having an interlocked engagement with the said longitudinal strip and the opposite sides of the main section.

2. In an egg case, the combination of a main section comprising a bottom, sides extending upward therefrom and provided with ventilation openings, a lid section provided with portions extending along the back and the opposite ends of the main section, a longitudinal strip having an interlocking connection at its opposite extremities with the end flaps of the lid section, a plurality of cross pieces having an interlocking connection with the sides of the main section, and a flap on the lid section forming a cover for the carton.

3. In an egg case, the combination of a main section comprising a bottom, sides extending upward therefrom and provided with ventilation openings, a lid section provided with portions extending along the back and the opposite ends of the main section, a longitudinal strip having an interlocked connection at its opposite extremities with the end flaps of the lid section, a plurality of cross pieces having an interlocked connection with the sides of the main section and projecting at one end beyond the outer surface of the adjacent side of the main section and a flap on the lid section adapted to embrace and rest against the projecting parts of the cross pieces.

4. In an egg case, a carton comprising a main section the walls of which are provided with ventilation openings, intersecting longitudinal and cross pieces forming individual egg cells, and a lid section having portions which extend along one of the long sides of the main section and across the ends of the main section, which portions of the lid section project below the bottom of the main section to form a supporting chime.

In testimony whereof I affix my signature in presence of two witnesses.

MARY E. VAN LUVEN.

Witnesses:
RICARDO A. S. ENCENBECKER,
J. L. WHEELER.